Figure 1:
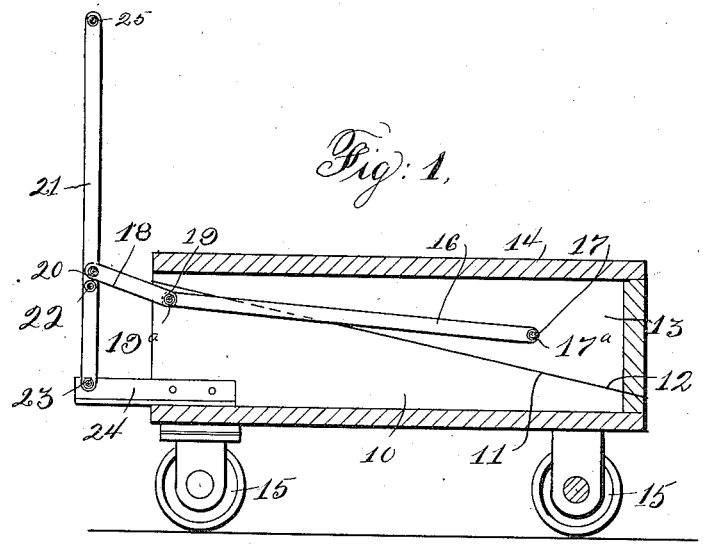

C. E. M. MILLER.
TRUCK.
APPLICATION FILED SEPT. 1, 1910.

976,201.

Patented Nov. 22, 1910.

Witnesses:

Carl E. M. Miller, Inventor
By his Attorney
W. P. Hutchinson.

UNITED STATES PATENT OFFICE.

CARL E. M. MILLER, OF NEW YORK, N. Y.

TRUCK.

975,201.

Specification of Letters Patent. Patented Nov. 22, 1910.

Application filed September 1, 1910. Serial No. 580,118.

*To all whom it may concern:*

Be it known that I, CARL E. M. MILLER, of the city, county, and State of New York, have invented a new and useful Improvement in Trucks, of which the following is a full, clear, and exact description.

My invention relates to improvements in trucks and especially to that variety of trucks in which opposed wedge shaped or inclined parts are placed one on the other, and the height of the truck body is regulated by moving these inclined parts in relation to each other. As heretofore constructed, devices of this kind have most frequently had a screw mechanism for moving one wedge shaped or inclined part on the other, but this arrangement while powerful, is slow in operation.

The object of my invention is to produce a truck which can be conveniently hauled around and easily placed beneath an object to be lifted and carried away, and at the same time to produce a simple and efficient means of moving the top member in relation to the other.

Another object of my invention is to produce a truck of the kind described which is simple and cheap.

The former type of truck referred to above is expensive, as it embodies more or less mechanism which has to be machined and well finished, whereas the truck which I have designed is very much cheaper.

Reference is to be had to the accompanying drawings forming a part of this specification, in which similar reference characters indicate corresponding parts in all the views.

Figure 2:
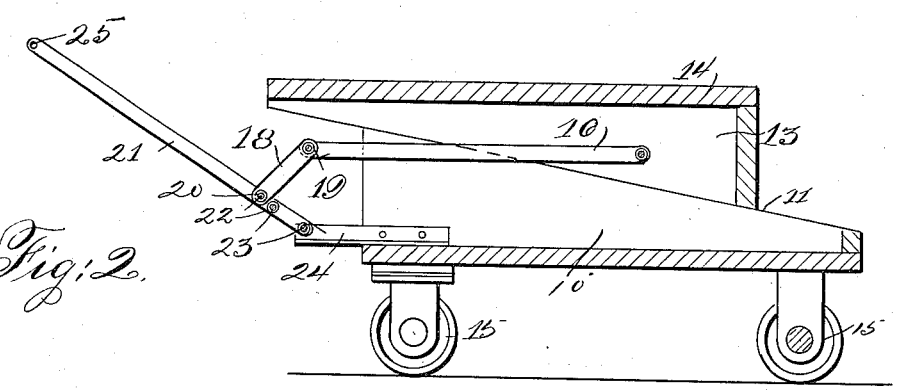
Figure 3:
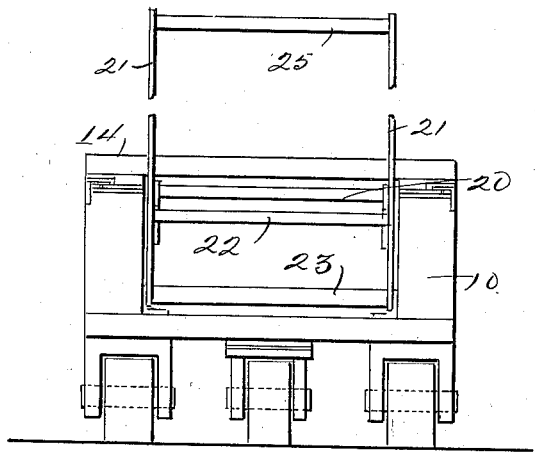

Figure 1 is a longitudinal section of the truck embodying my invention. Fig. 2 is a longitudinal section of the same showing the top of the truck raised, and Fig. 3 is a front elevation of the truck.

The truck is intended to be hauled around like ordinary trucks, and has a base or bottom section 10 which is of general wedge shape and provided with inclined top edges 11. These inclined edges abut with similarly inclined edges 12 of the top member 13, which is also of a general wedge shape and is provided with a platform 14. This top member 13 slides on the lower member 10, and it will be seen that by moving the top member forward, the height of the truck body will be increased, while by moving it in the opposite direction the height will be lessened. The chief object of my invention is to produce a quick, cheap and efficient means for sliding this top member on the lower member. The lower member 10 is provided with suitable wheels 15 and these can be secured to the member in any desired manner, as the manner of mounting the wheels is not material.

For moving the top member I provide links 16 which are pivoted on the upper member 13 near the rear end. The pivoting can best be effected by mounting them on a cross shaft 17, the latter being incased by a pipe 17ª which serves to space the members 16 with relation to each other. These links 16 extend forward and are pivotally connected at their outer ends to shorter links 18, the links 18 being in turn pivotally connected to the handle 21. The handle is bail-like in shape, and the links 18 can best be connected to the handle by pivoting them on the cross-bar 20 which connects the two sides of the handle. Just below the cross-bar 20, I provide another cross-bar 22 connecting the two sides of the handle. This cross-bar 22 serves as a fulcrum to the link 18 when the handle is moved forward as shown in Fig. 2. The object of this cross-bar 22 which engages the lower edge of the link 18 when the handle is moved forward, is to provide for a more horizontal pull upon the member 13 of the truck, and thereby reduce as much as possible the friction between the upper and lower members of the truck as they are moved back and forth in relation to each other. The sides of the handle 21 are pivotally secured at 23 to hangers 24, which latter are mounted upon the body of the truck and extend forward as shown in Figs. 2 and 3 to bring the handle in the right relation to the truck body.

A cross-bar 25 is provided which connects the sides of the handle 21 at the top. It will thus be seen that when the handle is pulled forward, the truck member 13 is likewise pulled forward and raised, and as the links 16 cross the meeting line of the upper and lower parts of the truck, they serve as braces to prevent lateral displacement of the top member 13.

It will thus be seen that I provide a truck of very cheap and strong construction, and one in which the parts can be operated very easily. It is apparent that when the truck is unloaded it can be moved along easily with the handle in a vertical position, and when it is placed beneath an article to be raised, the handle can be pulled forward so as to effect the necessary elevation, and that the handle can then be used to haul the truck and its load.

I claim:—

1. A truck comprising a lower wheeled member having inclined surfaces on the top of the sides thereof, an upper member having inclined surfaces on the bottom of the sides thereof riding on the top surfaces of the bottom member, a handle pivotally mounted on the lower member, a link pivoted to the top member and extending forward through the truck body, a second link pivotally connected to the first link at its outer end, said second link being pivotally connected to the handle, and an abutment on the handle engaging the lower edge of the second link when the handle is moved forward from the truck.

2. A truck comprising a wheeled lower member having inclined surfaces on the top of the sides thereof, a top member having inclined surfaces on the bottom of the sides thereof riding on the inclined surfaces of the bottom member, a handle pivotally mounted on the lower member, a link pivoted to the top member, a second link pivotally connected to the first link at its outer end and pivotally connected with the handle, and a rod horizontally supported in the handle and engaging the lower edge of the second link when the handle is pulled forward from the truck.

CARL E. M. MILLER.

Witnesses:
THOMAS T. SEELYE,
ARTHUR G. DANNELL.